(12) United States Patent
Kim et al.

(10) Patent No.: US 9,016,564 B2
(45) Date of Patent: Apr. 28, 2015

(54) SYSTEM FOR MONITORING PRODUCT QUALITY IN REAL TIME

(71) Applicant: Korea Food Research Institute, Seongnam-si (KR)

(72) Inventors: Byeong Sam Kim, Seongnam-si (KR); Ji Young Kim, Seoul (KR); Jong Hoon Kim, Seoul (KR); Ouiwoung Kim, Hwaseong-si (KR); Ki Hyun Kwon, Suwon-si (KR); Yoon Sook Kim, Seoul (KR); Hwan Soo Cha, Seongnam-si (KR)

(73) Assignee: Korea Food Research Institute (KR)

( * ) Notice: Subject to any disclaimer, the term of this patent is extended or adjusted under 35 U.S.C. 154(b) by 0 days.

(21) Appl. No.: 14/347,757

(22) PCT Filed: Oct. 2, 2012

(86) PCT No.: PCT/KR2012/007994
§ 371 (c)(1),
(2) Date: Mar. 27, 2014

(87) PCT Pub. No.: WO2013/051841
PCT Pub. Date: Apr. 11, 2013

(65) Prior Publication Data
US 2014/0252085 A1 Sep. 11, 2014

(30) Foreign Application Priority Data
Oct. 5, 2011 (KR) ........................ 10-2011-0101420

(51) Int. Cl.
*G06F 17/00* (2006.01)
*G01D 21/00* (2006.01)
*G06Q 10/08* (2012.01)

(52) U.S. Cl.
CPC ............ *G01D 21/00* (2013.01); *G06Q 10/0838* (2013.01); *G06Q 10/08* (2013.01)

(58) Field of Classification Search
USPC .......................................... 235/375, 380, 384
IPC .......... G07B 15/02,15/00; G07F 7/1008; G06Q 20/341, 30/02
See application file for complete search history.

(56) References Cited

U.S. PATENT DOCUMENTS

| | | | | |
|---|---|---|---|---|
| 7,339,469 | B2 * | 3/2008 | Braun | 340/539.13 |
| 8,047,432 | B2 * | 11/2011 | Breed | 235/384 |
| 8,508,368 | B2 * | 8/2013 | Potyrailo et al. | 340/572.1 |
| 8,674,834 | B2 * | 3/2014 | Phaneuf et al. | 340/572.8 |
| 2011/0254665 | A1 * | 10/2011 | Lindsay et al. | 340/10.5 |

FOREIGN PATENT DOCUMENTS

| | | |
|---|---|---|
| JP | 2004315154 | 11/2004 |
| JP | 2004323169 | 11/2004 |

(Continued)

OTHER PUBLICATIONS

International Search Report—PCT/KR2012/007994 dated Feb. 22, 2013.

*Primary Examiner* — Karl D Frech
(74) *Attorney, Agent, or Firm* — Cantor Colburn LLP (57) ABSTRACT

A product quality monitoring system includes: an RFID tag which is attached to a first packing container in which a product is packed, and transmits atmospheric history information and an identifier for a product distribution history; a QR code which is attached to a second packing container and stores the identifier and address information of a product quality predicting server; a product distribution history DB which stores the atmospheric history information and the identifier which are received from the RFID tag; a user terminal which connects with the product quality predicting server corresponding to the address information stored in the captured QR code, and requests a quality index of the product; and the product quality predicting server which calculates the quality index of the product or a time when the product has a specific quality index, from the atmospheric history information.

7 Claims, 4 Drawing Sheets

(56) References Cited

FOREIGN PATENT DOCUMENTS

| | | |
|---|---|---|
| JP | 2005251079 | 9/2005 |
| JP | 2006176297 | 7/2006 |
| KR | 1020080012118 | 2/2008 |
| KR | 1020080072362 | 8/2008 |
| KR | 1020090059616 | 6/2009 |

* cited by examiner

SYSTEM FOR MONITORING PRODUCT QUALITY IN REAL TIME

TECHNICAL FIELD

The present disclosure relates to a system for monitoring product quality in real time. More particularly, embodiments of the present disclosure relate to a product quality monitoring system using an RFID tag and a QR code.

BACKGROUND ART

Radio frequency identification (RFID), applications of which have been increasingly studied in recent years, refers to an advanced technology by which a target object is analyzed at a long range by using a predetermined frequency band such that dozens to hundreds of information is read. The radio frequency identification requires a sticker form of tag which includes a microchip therein, and is attached to a product, and a reader or an antenna, which is capable of recognizing tag information.

As product information is grasped through the RFID, an image of a cashier scanning a barcode attached to the product will disappear. Every time a shopper passes through a checkout, with purchasing products left in a shopping cart, costs of the purchasing products are accurately recognized so that the shopper may save time.

As soon as the product is sold, sellers can receive warehousing and shipping information of the product, thereby easily achieving expiration date management and stock management of the product. Moreover, since location tracing of the product is possible, after selling the product, the product may be prevented from being lost during the distribution process, and may be prevented from being stolen during transport process. Although the existing barcode and magnetic card have a problem in that a recognition rate is gradually deteriorated as time passes, in a case of the RFID, that's an unnecessary problem.

In general, although a refrigerator is used for preventing and delaying the decay of foods, since various items and quantities of foods are stored and kept in the refrigerator, and if close attention is not paid, the foods are kept in a form of being disorderly stacked in a receiving space of the refrigerator, it is difficult to identify the food items without searching through the receiving space of the refrigerator, and the foods frequently pass their expiration date, rot and are discarded.

While the foods (agricultural, marine, livestock products, and processed foods) are distributed from a production step to a consumption step (in a case of a consumer, when the consumer purchases the foods in a store or keeps the foods in the refrigerator at home), when a smart phone, a handheld terminal such as PDA, or a kiosk PC contacts the QR code or the RFID sensor tag, food checkers, consumers, and sellers can directly identify information such as history information, a distribution temperature history after harvest or production, a quality index, freshness, residual expiration date, and a time when the foods are most delicious.

DISCLOSURE

Technical Problem

Therefore, embodiments of the present invention have been made in view of the above-mentioned problems, and an aspect of the present invention is to propose a method for collecting atmospheric information (temperature, humidity, and gas) along a distribution channel of a product in real time.

Another aspect of the present invention is to provide an accurate quality index of the product to a purchaser or a product administrator by using the collected atmospheric information.

Still another aspect of the present invention is to propose a method in which the purchaser or the product administrator may conveniently identify the quality index of the desired product at any time, and anywhere.

Yet another aspect of the present invention is to propose a method for providing a quality index having differentiated data according to purchasing items to the purchaser or the product administrator.

Technical Solution

In accordance with an aspect of the present invention, there is provided a product quality monitoring system including: an RFID tag which is attached to a first packing container in which a product is packed, and transmits atmospheric history information comprising at least one of temperature, humidity, and gas concentration information, which has been measured, and an identifier for a product distribution history; a QR code which is attached to a second packing container, in which the product is packed and is relatively smaller than the first packing container, or the product, and stores the identifier and address information of a product quality predicting server; a product distribution history DB which stores the atmospheric history information and the identifier which are received from the RFID tag; a user terminal which connects with the product quality predicting server corresponding to the address information stored in the captured QR code, and requests a quality index of the product; and the product quality predicting server which calculates the quality index of the product, or a time when the product has a specific quality index, from the atmospheric history information received from the product distribution history DB, in response to the request of the user terminal.

In accordance with another aspect of the present invention, there is provided a product quality monitoring system including: a first packing container in which a product is packed; an RFID tag which is attached to the first packing container in which the product is packed, and transmits atmospheric history information comprising at least one of temperature and humidity, which has been measured, and an identifier; and a QR code which is attached to a second packing container, which the product is packed in and is relatively smaller than the first packing container, or the product, and stores link information of a product quality predicting server, and the identifier of the RFID tag.

In accordance with still another aspect of the present invention, there is provided a product quality monitoring system including: a product distribution history DB which stores atmospheric history information transmitted from an RFID tag, and an identifier of the RFID tag; a product quality predicting server which requests the atmospheric history information corresponding to the identifier of the RFID tag which is received from a user terminal, from the product distribution history DB, and calculates at least one of a quality index of a product, and a time when the product has a specific quality index, from the received atmospheric history information, by using a quality predicting algorithm for predicting quality of the product by means of the atmospheric history information.

Advantageous Effects

According to embodiments of the present invention, atmospheric information including temperature and humidity is collected along a distribution channel of a product, and a quality index of the product is provided to a purchaser on the basis of the collected atmospheric information. That is, the purchaser captures a QR code attached to the product by using a smart phone or other image device capable of capturing the QR code, thereby conveniently identifying the quality index of the product, which the purchaser desires to purchase, at any time, and anywhere, and a quality index having differentiated data according to purchasing items is provided such that optimal quality information for the items can be provided.

That is, a real time product quality monitoring system according to the present invention corresponds to a new ubiquitous technology by which, while foods (agricultural, marine, livestock products, and processed foods) are distributed from a production step to a consumption step (in particular, in a case of a consumer, when the consumer purchases the foods in a store), when the smart phone, a handheld terminal such as PDA, or a kiosk PC contacts a QR code or an RFID sensor tag, a food checker, a consumer, and a seller can directly identify food information such as history information, a distribution temperature history after harvest or production, a quality index, freshness, a residual expiration date, and a time when the foods are most delicious.

A producer attaches the QR code to an individual food, attaches a reusable sensor tag to a packing box, inputs food information immediately after production, connects with the internet on occasion to check a temperature history or a quality state in real time during distribution of a shipping product, and provides both quality information and distribution information to the consumer in advance to boost sales through an increase in consumer confidence. In particular, in the case of a fresh food, application efficiency can be enhanced.

In a case of a large-sized store, a checker of the store primarily can make use of the product quality monitoring system for checking products, and when the consumer locates the product on the kiosk PC, or scans the QR code by using a smart phone of his own, for the product which the consumer desires to purchase, the consumer can directly identify freshness information, a distribution temperature history, a residual expiration date, and quality index information (for example, a sugar content, and the number of bacteria). Moreover, a product price reduction sale can be automatically connected according to a freshness index, and quality information on a food in a display stand of the store as well as stock management, sale management, and quality management can be identified on a network at any time.

In distribution step, the product quality monitoring system can be used in the following manner. When food is transferred from a production area to a logistics center or a meal service center, a checker scans the QR code or the sensor tag to evaluate temperature history information and a freshness state of the received food. In this case, in view of the distribution temperature history, when the food is delivered in a state of being exposed to a temperature higher than or equal to a proper temperature, or when the freshness index is lower than or equal to a predetermined value, delivery rejection or delivery price cut can be applied. In this way, since a reception side can check all distribution temperature history information of the food, a supply side abides by a distribution temperature criterion or a quality criterion so that quality management is thoroughly performed, thereby making it possible to secure confidence of transportation, distribution, and delivery processes, and reduce discarding or returning the food.

Under a door-to-door delivery method, the product quality monitoring system can be used as in the following. Until now, a person sending a present such as a Korean beef gift set and a fish gift set has not been able to ask the person receiving the present what condition the present is delivered in. Although the present was delivered in a state where freshness was lowered, the person receiving the present has found it hard to say to the person sending the present that the quality of the present was not good. However, if this technology is employed, as soon as the present is received, the person receiving the present can immediately transmit freshness state information at a time of reception and temperature history information during the delivery, to the person sending the present, and can identify the information on the internet. Accordingly, in a case of an expensive gift whose freshness is important, when the door-to-door delivery service is provided in this way, responsibility is raised so that an important gift is desired to be sent through the delivery company. This technology can be applied to export and import of the food to and from other countries.

BRIEF DESCRIPTION OF THE DRAWINGS

The foregoing and other objects, features and advantages of the present invention will become more apparent from the following detailed description when taken in conjunction with the accompanying drawings in which.

DESCRIPTION OF REFERENCE NUMERALS

100: Product distribution history DB, 110: Product quality predicting server
120: User terminal, 130: RFIG tag
140: QR code, 150: Administrator terminal

BEST MODE

Mode for Invention

The above-described and additional aspects of the present invention will become more apparent from embodiments which will be described with reference to the accompanying drawings. Hereinafter, the embodiments of the present invention will be described in detail to be readily appreciated and realized by those skilled in the art.

Figure 1:
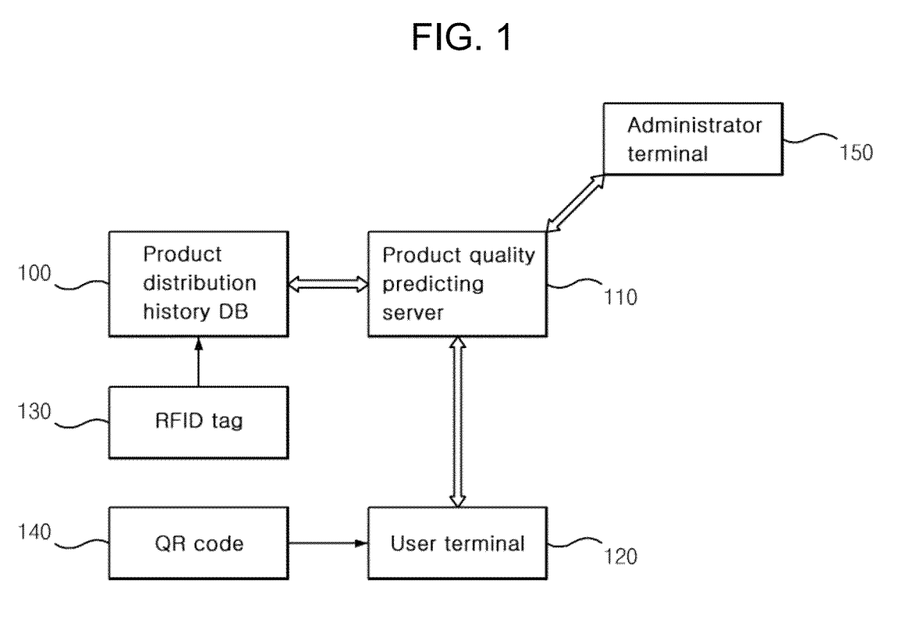
FIG. 1 is a block diagram showing a real time product quality monitoring system according to an embodiment of the present invention.

FIG. 1 is a block diagram showing a real time product quality monitoring system according to an embodiment of the present invention. Below, the real time product quality monitoring system according to the embodiment of the present invention will be described in detail with reference to FIG. 1.

Referring to FIG. 1, the product quality monitoring system includes a product distribution history database (DB), a user terminal, a product quality predicting server, a radio frequency identification (RFID) tag attached to a first packing container in which a plurality of products are packed, and a quick response (QR) code attached to a second packing container in which a separate product is packed. It is of course obvious that configurations other than the above-described configurations may be further included.

The RFID tag measures and stores state information of the atmosphere (climate), including temperature, humidity, and illumination, at a predetermined time interval. The information collected in the RFID tag together with an identifier of the RFID tag is transferred to the product distribution history DB 100 at a predetermined time interval, or at a time of request from the product distribution history DB 100. For communication with the product distribution history DB 100, the RFID tag 130 may include a communication unit, or may utilize another device including a communication unit.

The QR code 140 provides a uniform resource locator of the product quality predicting server 110. That is, the user terminal may connect with a web page of the server by using the QR code 140. In addition, the QR code 140 stores the identifier of the RFID tag 130.

The product distribution history DB 100 stores the atmospheric information transferred from the RFID tag 130 together with the container information. That is, the product distribution history DB 100 stores the atmospheric information and the product information for the containers. Table 1 shown below shows an example of information stored in the product distribution history DB 100. It is of course obvious that the information other than the above-described information may be stored in the product distribution history DB 100. That is, the product distribution history DB 100 may store information on a distribution channel of the product.

TABLE 1

| Identifier of packing container | Time of day | Temperature | Humidity |
|---|---|---|---|
| AAA | 2011.01.01 1:00 a.m. | 4° C. | 70% |
| | 2011.01.01 1:30 a.m. | 5° C. | 72% |
| | 2011.01.01 2:00 a.m. | 5° C. | 71% |
| | 2011.01.01 2:30 a.m. | 4° C. | 68% |

Table 1 shown above shows the temperature and the humidity according to the measuring time transferred from the RFID tag 130. According to Table 1, although the RFID tag 130 measures the temperature and the humidity at a time interval of 30 minutes, the time interval is not limited thereto. That is, the RFID tag 130 may measure the temperature or the humidity at the time interval which is more than or equal to 30 minutes, or is less than 30 minutes. Moreover, when there is no variation in the measured temperature and humidity, the RFID tag 130 may increase the length of time of the measuring period. That is, the tag may vary the measuring period depending on the variation in the measured temperature or humidity.

The product quality predicting server 110 predicts quality of a product requested from the user terminal, and provides the predicted result to the user terminal. To this end, the product quality predicting server 110 provides the identifier of the RFID tag 130 provided from the user terminal to the product distribution history DB 100, and receives the atmospheric information corresponding to the RFID tag 130 from the product distribution history DB 100. That is, the product distribution history DB 100 provides the atmospheric information shown in Table 1 to the product quality predicting server 110. The product quality predicting server 110 calculates quality information of the corresponding product by using the received atmospheric information and a stored product quality algorithm. The product quality predicting server 110 provides the calculated quality information to the user terminal 120.

The user terminal 120 includes a smart phone, a handheld terminal, and a kiosk PC. The user terminal 120 captures the QR code 140 attached to the product. The user terminal 120 is automatically connected with the product quality predicting server 110 through the QR code capture, and provides the identifier of the RFID tag 130 to the connected product quality predicting server 110. The user terminal 120 receives a quality index of the product to which the QR code is attached, from the product quality predicting server 110. The quality index of the product may be provided in various forms. A description regarding this will be given below.

The product quality monitoring system may include an administrator terminal 150 for administering the product quality predicting server 110 in addition to the above-described configurations. The administrator terminal 150 may renew a quality predicting algorithm employed in the product quality predicting server 110, and may request a quality index of a specific product, if necessary. Moreover, the administrator terminal 150 may add, modify, or change a form of the quality index which the product quality predicting server 110 provides.

Figure 2:
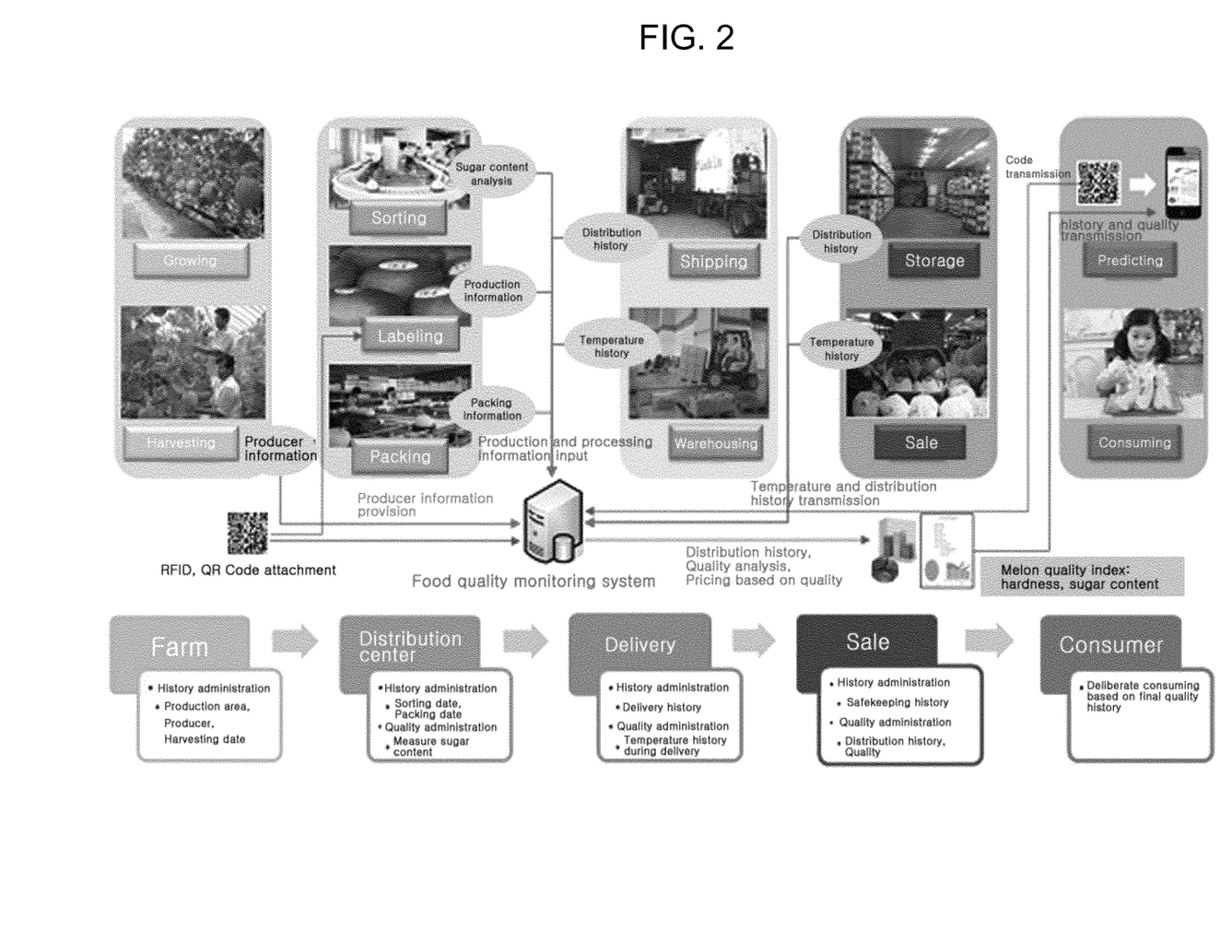
FIG. 2 is a schematic diagram showing a process of providing a quality index of a specific product by using a product quality monitoring system according to an embodiment of the present invention.

FIG. 2 is a schematic diagram showing a process of providing a quality index of a specific product by using a product quality monitoring system according to an embodiment of the present invention. Hereinafter, the process of providing the quality index of the specific product by using the product quality monitoring system according to the embodiment of the present invention will be described in more detail with reference to FIG. 2.

As an embodiment of the present invention, FIG. 2 shows a process of providing a quality index of melons.

As shown in FIG. 2, a distribution channel of the melons includes a farm, a distribution center, delivery, sale, and a consumer along the way. An administrator of the farm grows and harvests the melons. The administrator of the farm administers a production history of the melons. That is, the administrator of the farm administers the production history including a production area, a producer, and a harvest date of the melons. The administrator of the farm transmits information on the production history to the product quality predicting server, or the product distribution history DB.

The melons harvested on the farm are transferred to a distribution center. In the distribution center, the transferred melons are sorted according to a sugar content analysis and a size, labels in which production information is included are attached to the melons, respectively, if necessary, and then the melons are packed by using a first packing container in which a second packing container is included. As described above, the second packing container may be omitted, if necessary, and in this case, QR codes are directly attached to the melons, respectively. An RFID tag is attached to the first packing container, and the RFID tag measures information on the atmosphere surrounding the melons, and transfers the atmospheric information to the DB.

The information on the melons, which is collected in the distribution center, is transmitted to the product quality predicting server or the product distribution history DB. The information collected in the distribution center includes a sorting date, a packing date, and sugar content.

In the delivery step and the sale step, an administrator transmits a distribution history of the melons to the product quality predicting server or the product distribution history DB. Moreover, the RFID tag transmits atmospheric information measured at a predetermined time interval to the product distribution history DB.

The consumer purchasing the melon captures the QR code attached to the melon by using a user terminal, thereby requesting a quality index of the melon from the product quality predicting server.

The consumer decides whether or not to purchase the melon by using the quality index of the melon which is received from the product quality predicting server.

Although the melon is shown as an example in FIG. 2, the process of providing the quality index may also be identically applied to other agricultural and marine products, or process products. That is, the process of providing the quality index may also be identically applied to milk products or meat including beef. Of course, in this case, information transmitted from the distribution center to the product quality predicting server or the product distribution history DB may be different. That is, the distribution center for administering milk transmits the number of bacteria, production information, and packing information, and the distribution center for administering the meat transmits information on a butchery date, a meat grade, separation of the parts, and a packing date.

Figure 3:
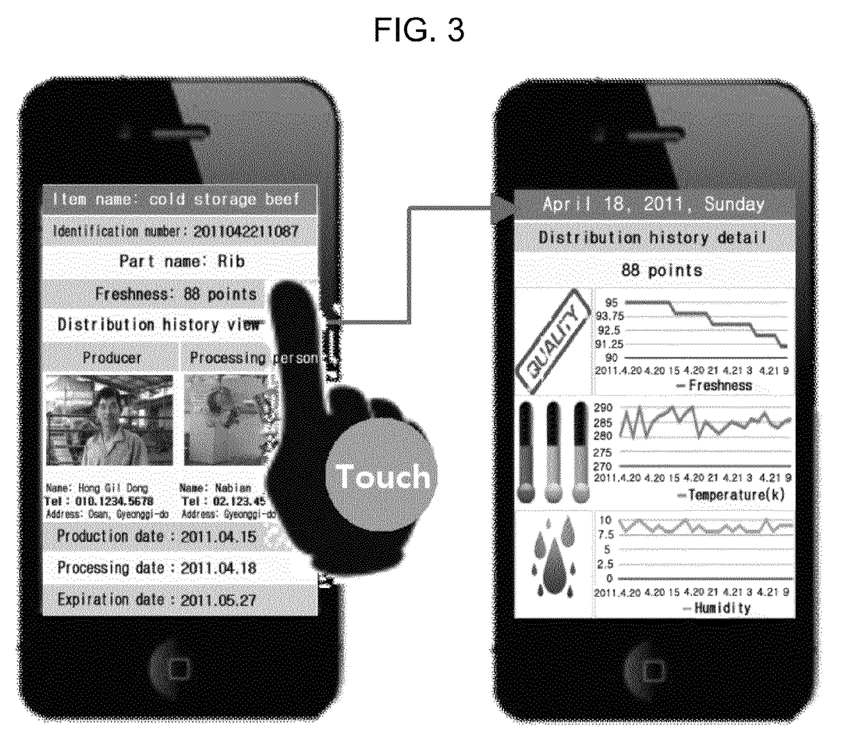
FIG. 3 shows an example of a quality index displayed on a user terminal according to an embodiment of the present invention.

FIG. 3 shows an example of a quality index displayed on a user terminal according to an embodiment of the present invention. Hereinafter, the quality index displayed on the user terminal according to the embodiment of the present invention will be described with reference to FIG. 3.

When capturing the QR code, the user terminal displays a screen shown on the left side of FIG. 3. An item name, an identification number, a part name, freshness, a distribution history view, a producer, a processing person, a production date, a processing date, and an expiration date are displayed on the screen shown on the left side of FIG. 3, and other various pieces of information may be displayed on the screen.

When a user selects the distribution history view on the screen shown on the left side of FIG. 3, the user terminal displays an image shown on a right side of FIG. 3. The distribution history detail includes histories of the freshness, temperature, and humidity during the distribution process.

Figure 4:
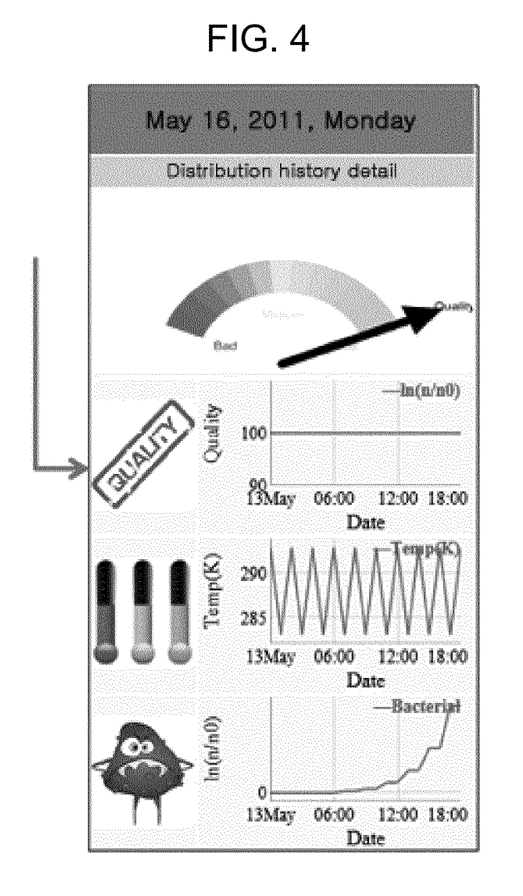
FIG. 4 shows an example of a screen displayed when a distribution history detail view of cold storage milk is selected according to an embodiment of the present invention.

FIG. 4 shows an example of a screen displayed when a distribution history detail view of cold storage milk is selected according to an embodiment of the present invention. In FIG. 4, a quality index is displayed in a doughnut shape. If an arrow is located in a red colored portion, it implies a low quality index, and if the arrow is located in a green colored portion, it implies a high quality index. In addition, the distribution history detail view shows temperature history, and bacteria number history. The number of the bacteria may be predicted based on the temperature history, and the quality index may be calculated depending on the predicted number of the bacteria. That is, the number of the bacteria increased in response to the temperature history is predicted with respect to an initial number of the bacteria, and the quality index is calculated depending on the predicted number of the bacteria. Table 2 shown below shows examples of the freshness depending on the number of the bacteria.

TABLE 2

| Number of bacteria ($n/n_0$) | Freshness |
|---|---|
| 1≤ | 100 |
| 2≤ | 90 |
| 3≤ | 80 |
| 4≤ | 70 |

TABLE 2-continued

| Number of bacteria ($n/n_0$) | Freshness |
|---|---|
| 5≤ | 60 |
| 5> | BAD |

In this way, when the distribution history view is selected, information provided for items may be differently set.

In addition, the product quality predicting server may calculate a time of highest quality with respect to a current quality index, and may provide the calculated information to the user terminal. That is, the product quality predicting server predicts a future quality index as well as the current quality index, and provides them to the user terminal. In this case, the product quality predicting server predicts the future quality index by using average temperature and humidity information within a predetermined period of time with respect to a current time, and provides the future quality index to the user terminal. The predetermined period of time may be varied according to the item. That is, in a case of an item having a short distribution period as compared with an item having a long distribution period, the predetermined period of time is made shorter.

The present invention may be applied to a product where quality is varied according to an atmospheric state including temperature and humidity, such as a food, blood, and cosmetics.

Although the embodiment for monitoring quality by using the QR code has been disclosed as described above, the present invention is not limited thereto. That is, the present invention may be applied to embodiments for monitoring quality by using a color code or a smart code which is identifiable at a long range.

While the present invention has been described with reference to the embodiment shown in the drawings, it is simply illustrative, and it will be understood by those skilled in the art that various modifications and other equivalent embodiments can be made without departing from the spirit and the scope of the present invention.

The invention claimed is:

1. A product quality monitoring system, comprising:
   an RFID tag which is attached to a first packing container in which a product is packed, and transmits atmospheric history information comprising at least one of temperature, humidity, and gas concentration information, which has been measured, and an identifier for a product distribution history;
   a QR code which is attached to a second packing container, which the product is packed in and is relatively smaller than the first packing container, or the product itself, and stores the identifier and address information of a product quality predicting server;
   a product distribution history DB that stores the atmospheric history information and the identifier which are received from the RFID tag;
   a user terminal that connects with the product quality predicting server corresponding to the address information stored in the captured QR code, and requests a quality index of the product; and
   the product quality predicting server that calculates the quality index of the product or a time when the product has a specific quality index, from the atmospheric history information received from the product distribution history DB in response to the request of the user terminal, wherein the product quality predicting server includes a quality predicting algorithm and calculates the quality index by using the quality predicting algorithm for predicting the quality of the product by means of the atmospheric history information.

2. The product quality monitoring system as claimed in claim 1, wherein the product quality predicting server differentiates information included in the quality index which is transferred to the user terminal, according to the product.

3. The product quality monitoring system as claimed in claim 2, further comprising:
an administrator terminal that administers the product quality predicting server,
wherein the administrator server sets the product quality predicting server to differentiate the information included in the quality index which is transferred to the user terminal, according to the product.

4. The product quality monitoring system as claimed in claim 3, wherein the quality index comprises at least one of a production history, a temperature history, a humidity history, a gas history, freshness, and the number of microorganisms.

5. The product quality monitoring system as claimed in claim 4, wherein the user terminal transmits the identifier of the RFID tag which is included in the QR code, to the product quality predicting server, and the product quality predicting server receives the atmospheric information corresponding to the identifier of the RFID tag from the product distribution history DB.

6. The product quality monitoring system as claimed in claim 1, wherein the QR code stores link information of the product quality predicting server, and the identifier of the RFID tag.

7. The product quality monitoring system as claimed in claim 1, wherein the user terminal acquires the identifier of the RFID tag from the QR code which is attached to the second packing container.

* * * * *